(12) United States Patent
Hoang

(10) Patent No.: US 6,175,656 B1
(45) Date of Patent: Jan. 16, 2001

(54) NON-LINEAR VIDEO SHARPENING FILTER

(75) Inventor: Dzung Hoang, San Jose, CA (US)

(73) Assignees: Sony Corporation, Tokyo (JP); Sony Electronics Inc., Park Ridge, NJ (US)

(\*) Notice: Under 35 U.S.C. 154(b), the term of this patent shall be extended for 0 days.

(21) Appl. No.: 09/276,010

(22) Filed: Mar. 25, 1999

(51) Int. Cl.$^7$ .................................................. G02B 7/02
(52) U.S. Cl. ............................................. 382/260; 382/266
(58) Field of Search ............................. 382/260, 199–200, 382/266–268, 261–265

(56) References Cited

U.S. PATENT DOCUMENTS

| | | | |
|---|---|---|---|
| 5,224,177 | \* 6/1993 | Doi et al. | 382/54 |
| 5,598,184 | \* 1/1997 | Barkans | 345/149 |
| 5,701,074 | \* 12/1997 | Zhu | 324/307 |
| 5,828,500 | \* 10/1998 | Kida et al. | 359/798 |
| 5,869,822 | \* 2/1999 | Meadows, II et al. | 235/380 |

\* cited by examiner

*Primary Examiner*—Thomas D. Lee
*Assistant Examiner*—Stephen Brinich
(74) *Attorney, Agent, or Firm*—Wood,Herron&Evans, L.L.P.

(57) ABSTRACT

A nonlinear video filter which provides an output of increased sharpness with reduced artifacts as compared to prior art filters. A "pivot" value is identified at a pixel based on the value of pixels neighboring that pixel. Then, a new value for the pixel is computed by adding to the pivot value, an amount based on the difference between the original pixel value and the pivot value. The pivot value may be computed as the average of the original values for a number, e.g., $2^n$, neighboring pixels, or as the average of the maximum and minimum original pixel values among the $2^n$ neighboring pixels. The difference between the original pixel value and the pivot value is multiplied by a factor k, and then added to the pivot value. For computational simplicity, the factor k is selected to be a power of two. Filtering for k=2, k=4 and k=16 are illustrated. The new value is limited to the maximum and minimum original pixel values among the $2^n$ original pixel values to avoid overshoot.

26 Claims, 4 Drawing Sheets

NON-LINEAR VIDEO SHARPENING FILTER

FIELD OF THE INVENTION

The present invention relates to filtering video signals to sharpen their appearance when displayed.

BACKGROUND OF THE INVENTION

Various techniques have been proposed to sharpen the appearance of video when displayed. The need for an effective and robust sharpening filter will be particularly apparent as higher definition video begins to become a household standard and users wish to view older, lower definition recordings on higher definition monitors.

One known technique for enhancing the sharpness of video is to apply a high-frequency boosting spatial filter to the video signals to thus enhance the edges in the video. However, this technique has proven less than satisfactory for the reason that linear filters having a high-boost characteristic also exhibit ringing in their step response. This ringing will manifest as regions of luminance or color variation near to the edges of an object when placed against a background of substantially different luminance or color.

Various nonlinear filters have also been proposed for video sharpening, which for example compare the luminance values within a region and determine statistical properties Such as the minimum, maximum, average and median luminance values, from which a new value for pixels within the region can be derived. However, despite the efforts that have been applied to developing a nonlinear sharpening filter, known filters continue to display unwanted artifacts that make those filters less than completely desirable for all applications.

SUMMARY OF THE INVENTION

The present invention provides a nonlinear filter which overcomes these difficulties, and provides an output of increased sharpness with reduced artifacts as compared to prior art filters.

In one aspect, a method of filtering according to the invention proceeds by identifying a "pivot" value at a pixel based on the value of pixels neighboring that pixel. Then, a new value for the pixel is computed by adding to the pivot value, an amount based on the difference between the original pixel value and the pivot value.

In the specific embodiment described below, the pixel values are luminance values. The pivot value is computed as the average of the original values for a number, e.g., $2^n$, neighboring pixels, where n is, for example, equal to 3. Alternatively, the pivot value may be computed as the average of the maximum and minimum original pixel values among the $2^n$ neighboring pixels.

To compute the new value for a pixel, the difference between the original pixel value and the pivot value is multiplied by a factor k, and then added to the pivot value. For computational simplicity, the factor k is selected to be a power of two. Filtering for k=2, k=4 and k=16 are illustrated.

The new value may be limited to the maximum and minimum original pixel values among the $2^n$ original pixel values.

The invention also features filtering hardware for carrying out the filtering methods described above.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
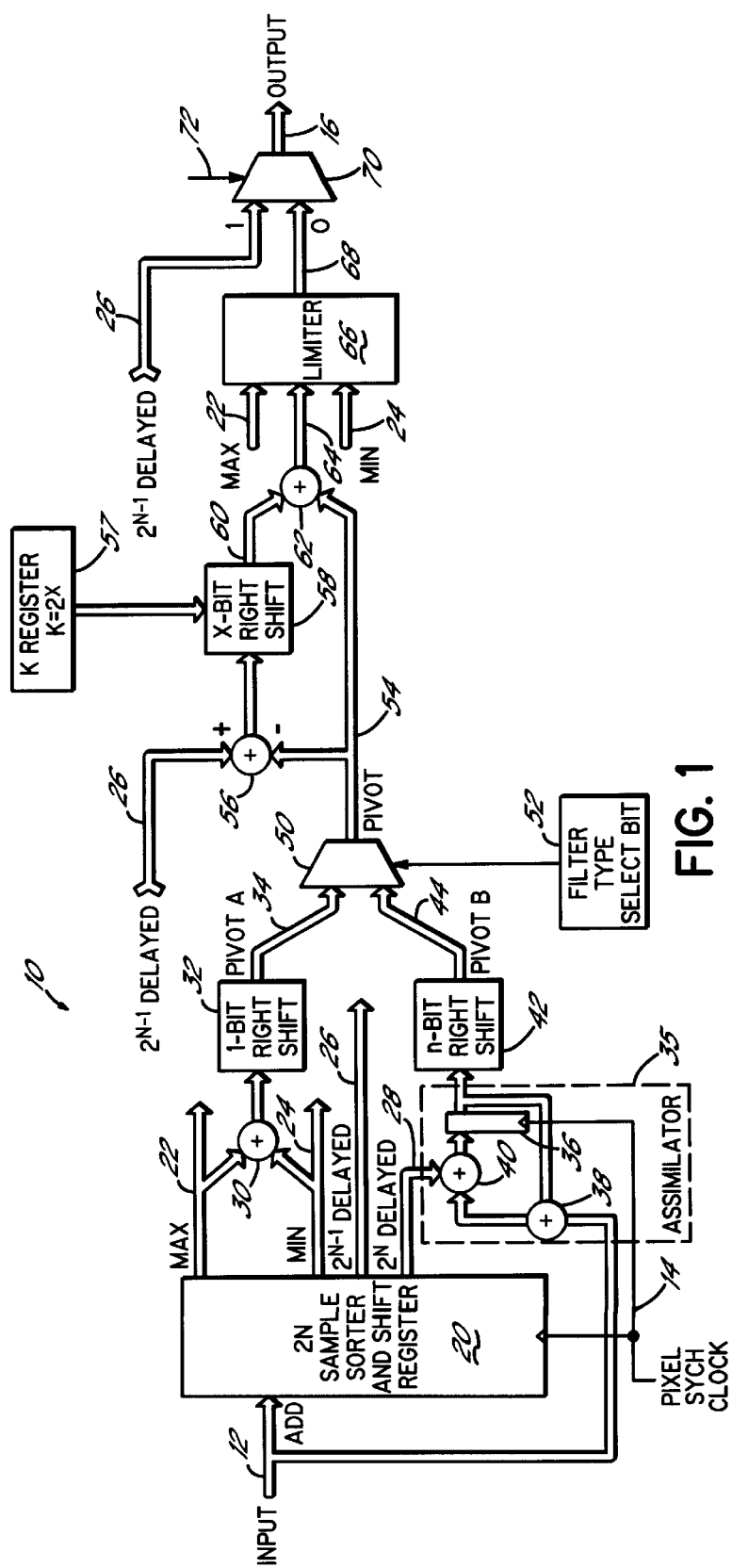
FIG. 1 is an illustration of a custom hardware embodiment for performing filtering in accordance with principles of the present invention.

In accordance with principles of the present invention, video filtering is performed on pixel luminance values by computing, for a set of adjacent pixels, various features such as the maximum luminance value and minimum luminance value. In the exemplary embodiment described below, a set of $2^n$ horizontally adjacent pixels are analyzed to determine maximum and minimum values and for other calculations, so that filtering is performed in one dimension horizontally. Principles of the present invention, however, can also be applied to filtering in the vertical dimension, by applying the described techniques to a set of $2^n$ vertically adjacent pixels. Filtering can also be done in accordance with the present invention, in both the vertical and horizontal directions. Furthermore, principles of the present invention could also be applied to sharpening of other video parameters than luminance, for example, color values could be processed.

Based on an input set of $2^n$ adjacent pixels, in accordance with principles of the present invention, a maximum luminance value and minimum luminance value for the pixels in the set is determined. Having these values, the intensity of an edge in the video, i.e., a transition from a region of low luminance to high luminance or vice-versa, can be accentuated.

A simplified embodiment of a nonlinear filter in accordance with the present invention, further computes a median and average value for the pixels in the input set. Using the median and average values, an output for a pixel is then computed according to the formula Output=IF(Average>Median) THEN Minimum ELSE Maximum, (1)

i.e., the output value for a pixel is set equal to the minimum value when the average of the $2^n$ neighboring pixels is greater than the median (indicating that the current pixel is before the middle of a rising edge or after the middle of a falling edge), and set equal to the maximum value when the average of the $2^n$ neighboring pixels is less than or equal to the median (indicating that the current pixel is after the middle of a rising edge or before the middle of a falling edge).

This filter has the desired effect of enhancing edges, however, not without some noticeable artifact, in particular, loss of detail in relatively low-contrast areas of the image.

To reduce this loss of detail in low-contrast areas, a second embodiment of a nonlinear filter in accordance with the present invention, computes an edge strength value indicative of whether there is a sharp edge within the input set of $2^n$ pixels, so that in areas with low edge strength, the modification of the pixel value from its original value is minimized. The edge strength value can be computed from the difference between median and average values, since the median and average values will only substantially deviate when there is a substantial change in the luminance values within the input set of $2^n$ pixels. This difference is normalized by dividing by the gap between maximum and minimum values in the input set of $2^n$ pixels. Thus, in this second embodiment, the strength value is computed at a pixel according to the formula Strength=|Average−Median|/(Maximum−Minimum). (2)

Then, an output for a pixel is then computed according to the formula

Output=IF(Average>Median)

THEN Strength×Minimum+(1−Strength)×Input

ELSE Strength×Maximum+(1−Strength)×Input. (3)

This second embodiment of a filter according to the present invention exhibits good enhancement of edges with few noticeable artifacts. However, this embodiment has a disadvantage that computation of a pixel output value requires a floating point divide (to compute the Strength value) as well as two floating point multiplies (to multiply the Strength value by the Minimum/Maximum and by the Input value). This makes the filter computationally intensive and also expensive in terms of hardware required for implementation in custom circuitry.

To alleviate these disadvantages, in accordance with a third embodiment of a nonlinear filter in accordance with the present invention, nonlinear filtering is performed without requiring floating point multiplication or division operations. In this embodiment, a pivot value is computed for each input pixel. The pivot value is representative of whether the pixel is "above" or "below" any identifiable edge in the neighboring pixels. Once a pivot value is determined, then the output value for a pixel can be computed according to the formula Output=K×(Input−Pivot)+Pivot. (4)

The resulting Output value is then limited to the Maximum and Minimum input values to prevent overshoot or "ringing" artifacts. K is a filtering parameter and is adjustable between, for example, values of 1 and 20. It will be noted that the K value can be chosen to be an integer power of two, i.e., $K=2^x$, where x is a positive integer; doing so simplifies the product K×(Input−Pivot) to an x-bit binary shift to the left. Thus, an Output value can be computed from an input value without any floating point divides or multiplications.

The pivot value can be computed, for example, as the average of a given number of neighboring pixel values. If the given number of neighboring pixel values is chosen to be an integer power of two, i.e., $2^n$ pixels, then the pivot value can be computed without a floating point divide, by simply adding the $2^n$ pixel values and shifting the binary result to the right by n bits. Alternatively, the pivot value can be computed as the average of the maximum and minimum values of the neighboring pixels. This pivot value can also be computed without a floating point divide, by simply adding the maximum and minimum values and shifting the binary result one bit to the right.

Referring now to FIG. 1, an explanation can be provided for one hardware implementation of a one-dimensional, horizontal pixel filter 10 in accordance with this third embodiment of the present invention. Filter 10 receives input pixel values on bus 12, synchronized to a pixel synchronization clock signal on line 14. Filter 10 produces output pixel values on bus 16. Filter 10 is pipelined and has a latency of $2^{n-1}$ periods of the pixel synchronization clock signal on bus 14, so that an output pixel value for a given location in a scan line is produced on bus 16 $2^{n-1}$ pixel clock periods after an input value for the same location is received on bus 12.

Pixel values received from bus 12, and the pixel synchronization clock signal on line 14 are delivered to a $2^n$ pixel sorter and shift register circuit 20. Circuit 20 responds to these inputs by producing outputs on busses 22, 24, 26 and 28. Circuit 20 produces a Maximum signal output on bus 22 which corresponds to the largest pixel value of the $2^n$ pixel values that were most recently received by circuit 20. Similarly, circuit 20 produces a Minimum signal output on bus 24 which corresponds to the smallest pixel value of the $2^n$ pixel values that were most recently received by circuit 20. Circuit 20 also produces a $2^{n-1}$ delayed signal on bus 26 which corresponds to the pixel input value that was received $2^{n-1}$ periods (of the pixel synchronization clock) earlier. Finally, circuit 20 produces a $2^n$ delayed signal on bus 28 which corresponds to the pixel input value that was received $2^n$ periods (of the pixel synchronization clock) earlier. Details of the internal operations of circuit 20 can be understood by reference to FIG. 2, discussed below.

The Maximum and Minimum signal outputs of busses 22 and 24 from circuit 20 are fed to an adder 30 which adds these signals together. The output of adder 30 is fed to a 1-bit right shift circuit 32, which has the effect of dividing the sum of the Minimum and Maximum values by two, without rounding, to produce a result on line 34 representative of the average of those Minimum and Maximum values, which is the first alternative pivot value that can be used by filter 20, as discussed above.

To compute the second alternative pivot value discussed above, an accumulator circuit 35 is used. Accumulator circuit includes a register 36 for storing a current accumulated value for $2^n$ previously received pixels. To compute a new accumulated value within adder 38, the output of register 36 is added to the new input value on bus 12. Then, in adder 40, the $2^n$ delayed pixel value produced on bus 28 by circuit 20, is subtracted from the output of adder 38. The resulting output of adder 40 is the next accumulated value, which is clocked into register 36 by the next pixel synchronization clock transition on line 14.

The output of register 36, which is the current accumulated value of the most recently received $2^n$ pixels, is delivered to an n-bit right shift circuit 42, which produces an output on line 44 equal to the output of register 36 shifted n places to the right, which has the effect of dividing the accumulated value of the neighboring $2^n$ pixels by $2^n$, without rounding, thus producing on line 44 the average of the $2^n$ most recently received pixels, which is the second alternative pivot value that can be used by filter 20, as discussed above.

It will be noted that the "window" of $2^n$ pixel values used in computing Maximum, Minimum, and pivot values according to the present filtering technique, includes pixel values that are received before and after the pixel value being filtered, i.e. are spatially positioned on both sides of the location of the pixel for which an output value is being computed. This is the reason for the $2^{n-1}$ pixel latency of the filtering circuit 10. To compute an output value for a pixel, the input value for that pixel is combined with the input values of $2^{n-1}$ previously received and $2^{n-1}-1$ subsequently received pixels to determine Minimum, Maximum and pivot values. These values are then combined with the original pixel value in accordance with formula (4) provided above, to compute an output value for the pixel. Accordingly, it will be appreciated that the Minimum, Maximum and pivot values that are based on the window of $2^n$ pixel values accumulated in circuit 20, should be used in conjunction with the pixel value on line 26, which is delayed by $2^{n-1}$ periods of the pixel synchronization clock, to produce an output value which is also delayed by $2^{n-1}$ periods of the pixel synchronization clock.

The first and second pivot values generated by the hardware described above, are delivered to a multiplexer 50 which selects a pivot value based upon a filter type selection bit in a register 52. Thus, the appropriate pivot value is delivered to bus 54 at the output of multiplexer 50.

In accordance with formula (4) provided above, an adder 56 subtracts the pivot value on bus 54 from the $2^{n-1}$ delayed pixel value on bus 26. The resulting (possibly negative) value is represented, for example, as a two's complement binary number. This number is then multiplied by the filter parameter K as set forth in formula (4) above. As noted above, K is advantageously selected to be an integer power of 2, i.e., $K=2^x$ where x is a positive integer. When K is chosen as an integer power of 2, then multiplication by K can be achieved by a bit shift. In the hardware embodiment illustrated in FIG. 1, a value for x is stored in a register 57, and supplied to an x-bit left shift circuit 58 which produces an output on bus 60 that is equal to K(Input−Pivot) as set forth in formula (4) above.

In accordance with formula (4) above, an adder 62 adds the two's complement formatted result on bus 60 to the pivot value on bus 54 to produce an output pixel value on bus 64. This output pixel value is then delivered to a limiter 66. Limiter 66 limits the output pixel value to no greater than the Maximum value on bus 22 and no less than the Minimum value on bus 24, producing a limited output on bus 68 for the pixel. The output on bus 68 is fed to an input of a multiplexer 70. The second input to multiplexer 70 receives the $2^{n-1}$ delayed pixel value on bus 26. Multiplexer 70 produces a final output on bus 16. Multiplexer 70 is controlled by a control signal on line 72. Filtering can be disabled by controlling multiplexer 70 via line 72 to deliver the $2^{n-1}$ delayed pixel value from bus 26 to output bus 16. Also, since the filtering technique described herein requires the use of $2^n$ neighboring pixels, pixels at the edges of the displayed image are not filtered; accordingly, during output of the first $2^n-1$ pixels or the last $2^n$ pixels of a filtered line of pixels, multiplexer 70 is controlled to deliver the $2^{n-1}$ delayed pixel value from bus 26 to output bus 16.

Figure 2:
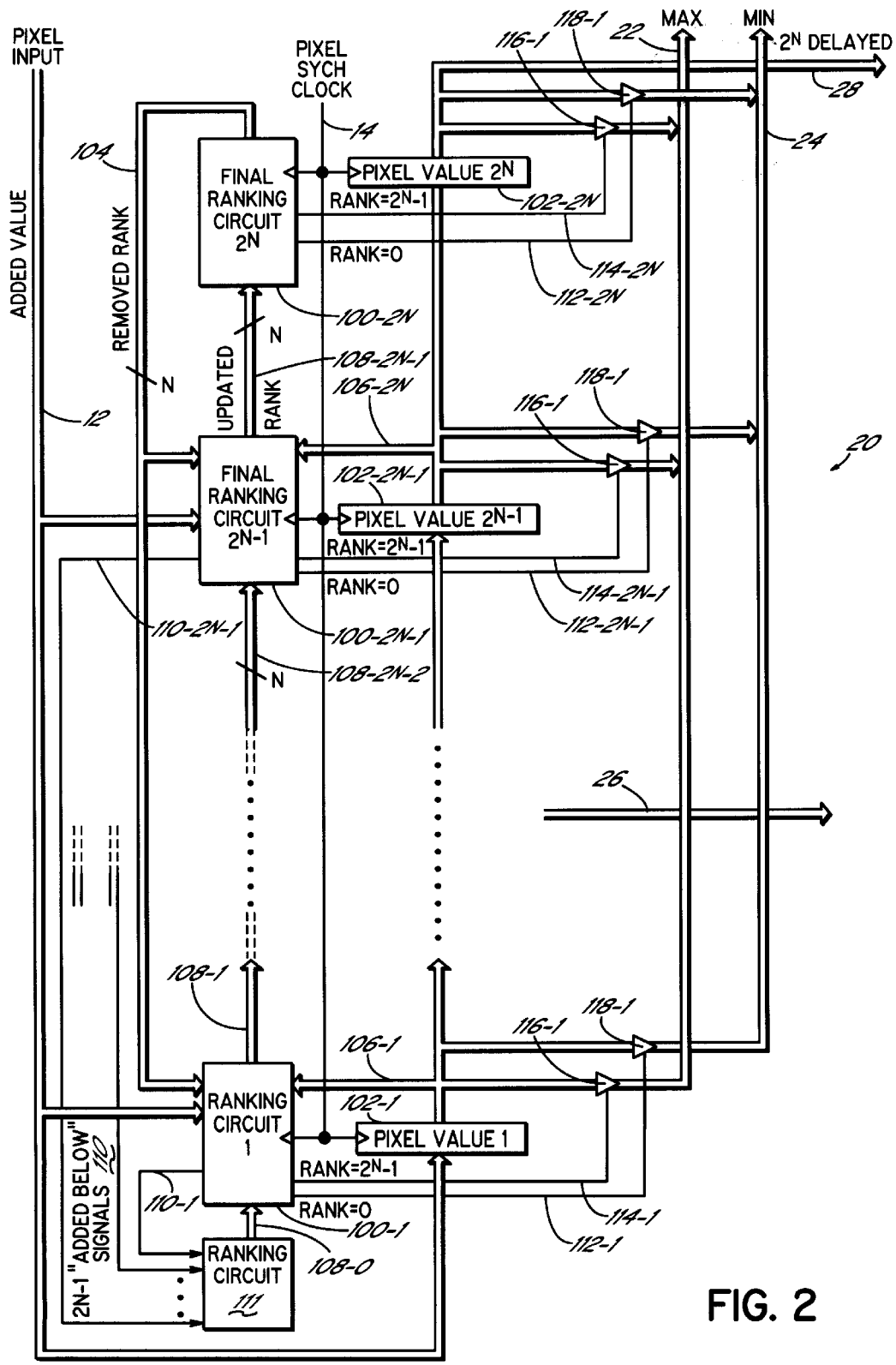
FIG. 2 is an illustration of a hardware embodiment of a $2^n$ pixel sorter and shift register for facilitating filtering in accordance with principles of the present invention.

Referring now to FIG. 2, details of the $2^n$ sample sorter and shift register circuit 20 can be explained. This circuit includes a plurality of ranking circuits 100 and a plurality of pixel value registers 102. Ranking circuits 100 and pixel value registers 102 are each synchronously clocked in response to the pixel clock synchronization signal on line 14. Pixel value registers 102 are connected in series to form a shift register to store and output delayed pixel values. Pixel value register 1, labeled 102-1, receives the input pixel value from bus 12, and delivers a one clock period delayed pixel value to pixel value register 2 (not shown). Pixel value registers 102 are connected in this serial fashion through pixel value register $2^n-1$, labeled 102-$2^n$-1, which receives a $2^n-2$ clock period delayed pixel value and delivers a $2^n-1$ clock period delayed pixel value to pixel value register $2^n$, labeled 102-$2^n$. Pixel value register $2^n$ delivers a $2^n$ clock period delayed pixel value to output bus 28. Intermediate the pixel value registers 102 shown in FIG. 2, is a pixel value register $2^{n-1}$ (not shown), which delivers a $2^{n-1}$ clock period delayed pixel value to output bus 26.

Adjacent to each pixel value register is an associated ranking circuit 100. Ranking circuits 100 perform the function of ranking the pixel values stored in the adjacent pixel value circuits with a rank value from 0 to $2^n-1$. The ranking circuits 100 are serially connected in a manner analogous to the pixel value circuits 102. Each ranking circuit 100 is synchronously clocked by the clock signal on line 14, and in synchrony with this clock signal, receives and latches a current rank from the immediately preceding ranking circuit, simultaneously with the receipt of the corresponding pixel value by the associated pixel value register 102.

The ranking circuits 100, with the exception of the final ranking circuit 100-$2^n$, each compute a new ranking for the pixel value in the associated pixel value circuit 102, based upon the latched prior ranking received from the immediately preceding ranking circuit, the pixel value, the rank of the $2^n$ delayed pixel value, and the value of the new pixel being received on line 14. Specifically, each ranking circuit 100-1 to 100-$2^n$-1, receives as inputs (a) the new pixel value on line 14, (b) the current rank of the $2^n$ clock period delayed pixel value, from bus 104 which connects to the output of ranking circuit 100-$2^n$, (c) the value of the pixel stored in the associated pixel value register 102 and received on a bus 106, and (d) the latched pixel value rank received on a bus 108 from the immediately preceding ranking circuit. In response to these inputs, the ranking circuit generates a new pixel value rank for delivery on a bus 108 leading to the latched input of the next ranking circuit 100.

Each ranking circuit 100-i, i=0 to $2^n$-1, computes and produces a new pixel value rank on its output bus 108-i in accordance with the following rules, which are executed in parallel to increment, decrement, or leave unchanged the pixel value rank: (a.) if the rank of the $2^n$ delayed pixel value on bus 104 is less than the current rank value latched into the ranking circuit 100-i from its input bus 108-i−1, then the current rank is decremented by 1 for production on the output bus 108-i; (b.) if the pixel value currently in the associated pixel value register 102 and delivered on bus 106-i, is greater than the new pixel value received on bus 12, then the current rank is incremented by 1.

Each ranking circuit 100-i, i=0 to $2^n$-1, also produces additional output signals to aid in the initial ranking of the new pixel value received on bus 12. Specifically, a ranking circuit 100-i produces a "1" valued "added below" signal on a line 110-i, if the pixel value currently in the associated pixel value register 102-i and delivered on bus 106-i, is greater than the new pixel value received on bus 12. Otherwise, a ranking circuit 100-i produces a "0" valued "added below" signal on a line 110-i.

The input on bus 108-0 to the first ranking circuit 100-1 is generated by a rank determiner circuit 111. Rank determiner produces an n-bit value on its output bus 108-0 which is equal to the number of "0" value "added below" signals received on lines 110 from the $2^n-1$ ranking circuits 100-1 through 100-$2^n$-1. It will be appreciated that this n-bit value will reflect the initial rank of the newly-received pixel value on bus 12.

The foregoing describes the operations of the ranking circuits 100-1 through 100-$2^n$-1. The last ranking circuit 100-$2^n$ has a more simple operation because it does not need to compute a new rank for the $2^n$ pixel clock period delayed pixel value, as that value will not be in the set of $2^n$ samples to be ranked during the next clock cycle. Accordingly, the last ranking circuit 100-$2^n$ simply delivers to its output bus 104, the pixel rank most recently latched from its input bus 108-$2^n$-1.

All of the ranking circuits 100-i, i=0 to $2^n$ (i.e., including the last ranking circuit), produce appropriate control signals for generating the Maximum and Minimum pixel value signals on output busses 24 and 22. Specifically, each ranking circuit 100-i produces a "rank=0" signal on a line 112-i, if the latched pixel rank latched from its input bus 108-i-1 is equal to 0, otherwise not; each ranking circuit 100-i also produces a "rank=$2^n$-1" signal on a line 114-i, if the latched pixel rank latched from its input bus 108-i-1 is equal to $2^n$-1, otherwise not. The "rank=0" and "rank=$2^n$-1" signals on lines 112-i and 114-i are delivered to respective tri-state bus drivers 118-i and 116-i. The inputs for bus drivers 118-i and 116-i are connected to the respective output bus 106-i of the associated pixel value register 102-i. The outputs for bus drivers 118-i and 116-i are respectively connected to the minimum pixel value output bus 24 and the maximum pixel value output bus 22. A driver 118-i is enabled and delivers its input signal to the output bus 24 only when the "rank=0" signal on the associated line 112-i is asserted, otherwise not. A driver 116-i is enabled and delivers its input signal to the output bus 24 only when the "rank=$2^n$-1" signal on the associated line 114-i is asserted, otherwise not. It will be appreciated that only one "rank=0" and one "rank=$2^n$-1" signal will be asserted at any one time, and accordingly the minimum and maximum pixel values will be appropriately delivered to the output busses 24 and 22.

It will be appreciated that upon start-up initialization of the circuitry described herein, pixel value registers 102 and ranking circuits 100 and accumulator register 36 must be initialized to appropriate and consistent values for proper operation. For example, accumulator register 36 may be initialized to a value of 0, in which case all pixel value registers 102 must also be initialized to a value of 0. For proper operation, ranking circuits 100 must be initialized to contain each and every one of the values from 0 to $2^n$-1; for example, ranking circuit 1 100-1 can be initialized to have a rank of 0, ranking circuit 2 can be initialized to have a rank of 1, and so on until ranking circuit $2^n$ 100-$2^n$ is initialized to have a rank of $2^n$-1.

Figure 3A:
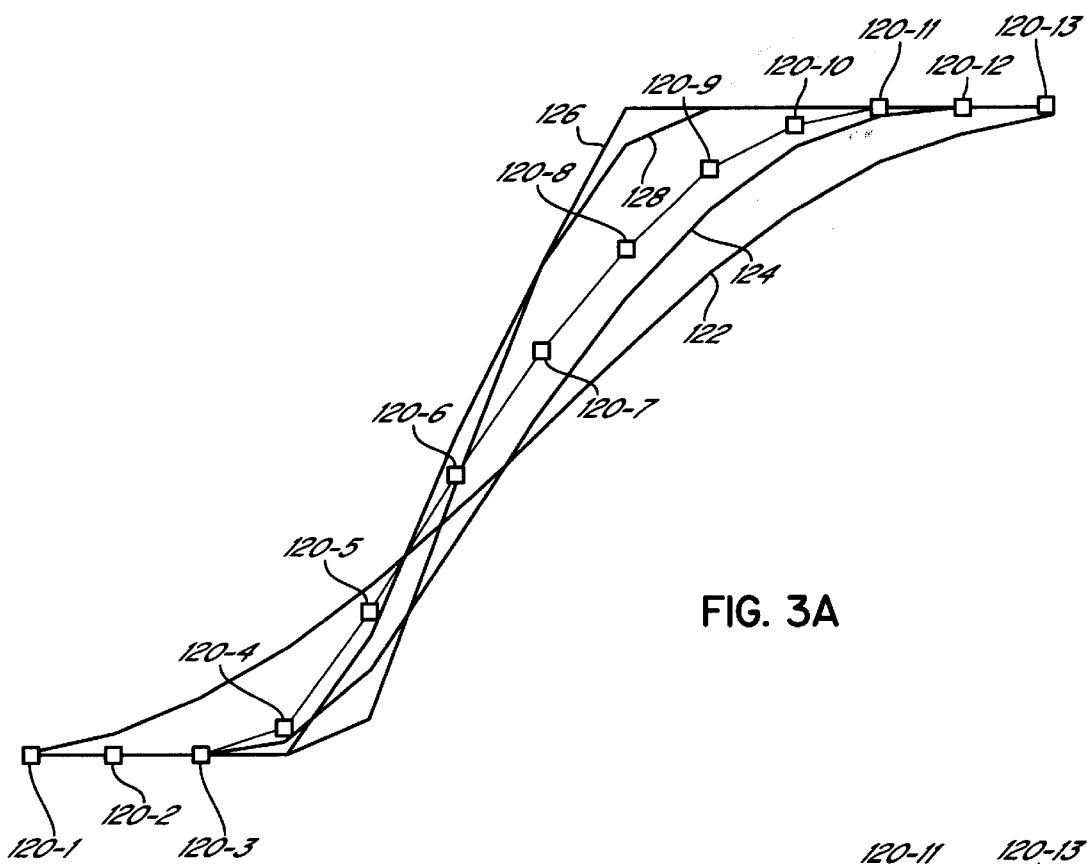
FIGS. 3A, 3B and 3C are illustrations of pixel luminance value inputs and outputs exemplifying the filtering achieved with the present invention using the respective filtering parameter values k=2, k=4 and k=8.
Figure 3B:
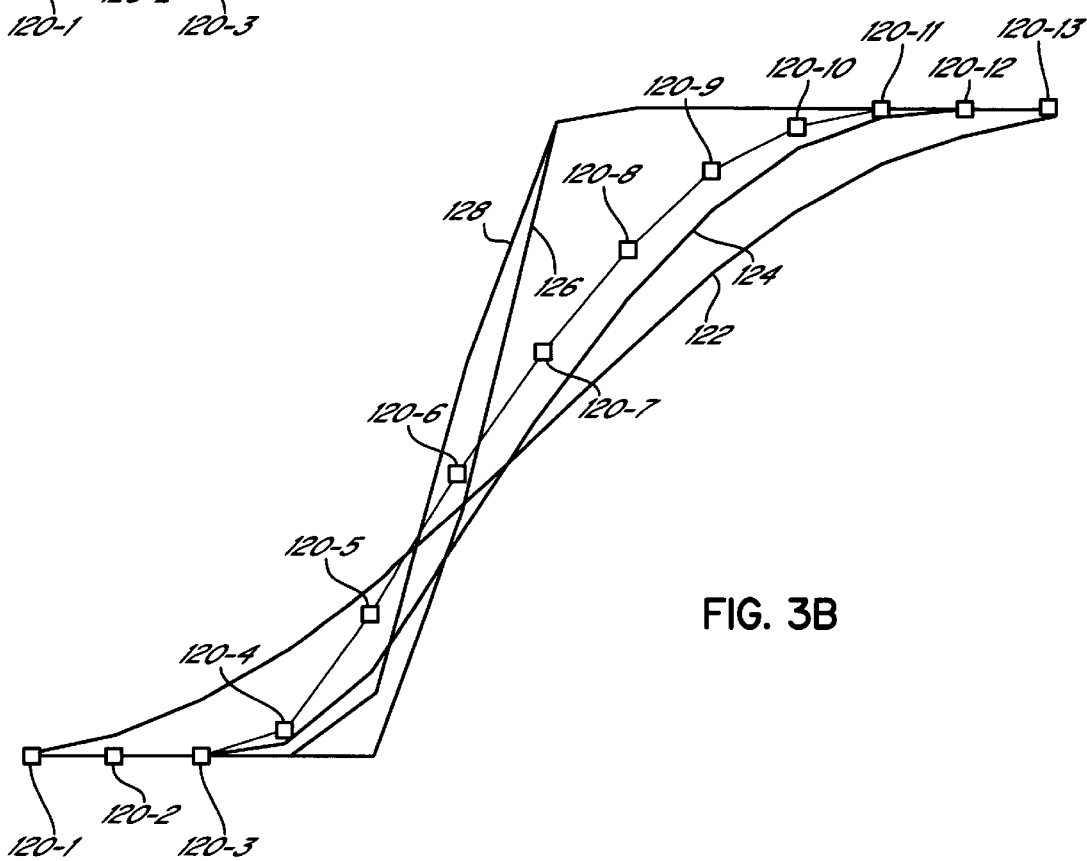
Figure 3C:
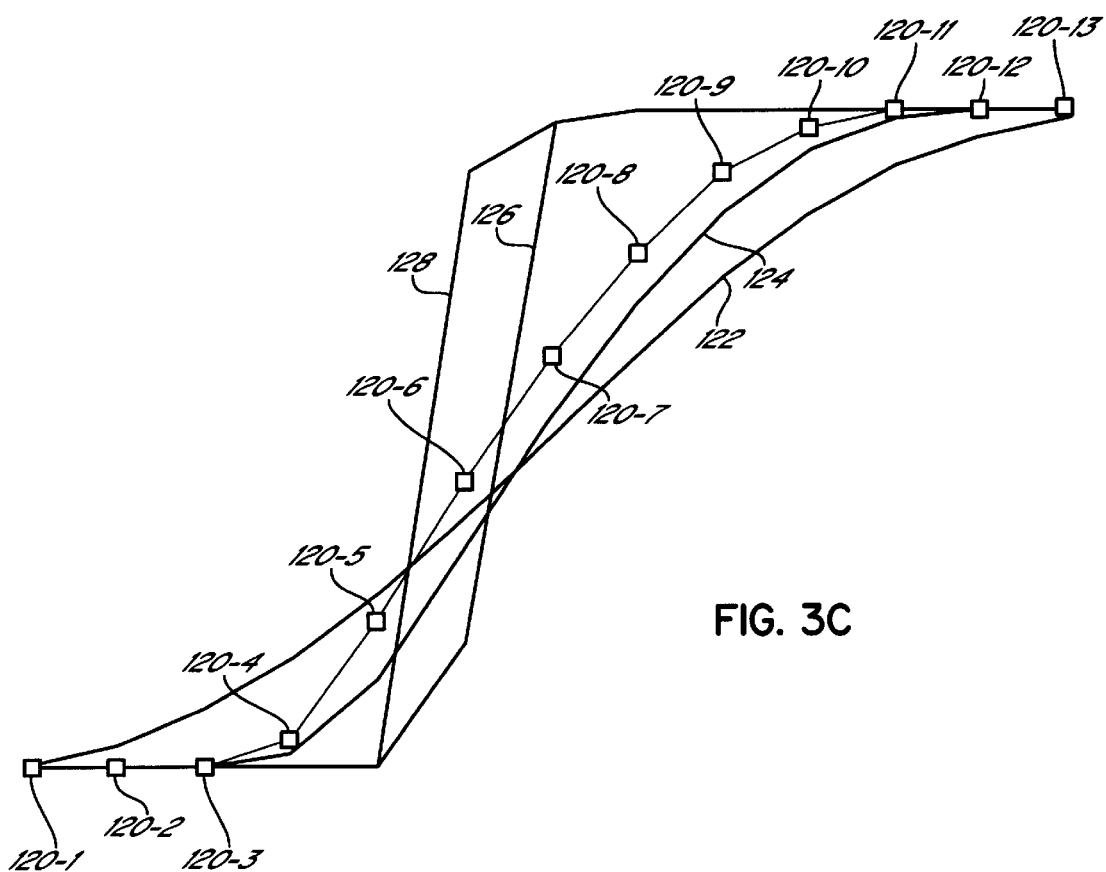

The results that can be produced in accordance with the filter of formula (4) and the hardware embodiment of FIGS. 1 and 2 has been simulated in software. Referring now to FIGS. 3A–3C, the results of this simulation on a simulated blurry step transition in luminance can be seen. Specifically, each figure illustrates thirteen pixel values 120 showing a slow transition from a minimum value (at pixels 120-1 through 120-3) to a maximum value (at pixels 120-11, 120-12 and 120-13). Illustrated in each figure are the average of eight neighboring pixel values at each point (curve 122) and the median value of eight neighboring pixels at each point (curve 124). Also illustrated are the output pixel values produced by filtering in accordance with formula (4) and the hardware shown in FIGS. 1–2, where n=3. Curve 126 shows output values produced for a pivot value equal to the average of the minimum and maximum values of the neighboring eight pixels, and curve 128 shows output values produced for a pivot value equal to the average of all of the neighboring eight pixels. FIG. 3A shows curves 126 and 128 for a filter parameter k=2, FIG. 3B shows curves 126 and 128 for a filter parameter k=4, and FIG. 3C shows curves 126 and 128 for a filter parameter k=16. It can be seen that in each figure, the output pixel values exhibit a much sharper transition from the minimum to maximum pixel values than the original pixel values, which will make the resulting picture output substantially sharper. The extent of the change is affected by the selected parameter value k, as can be seen by comparing the figures.

It should be noted that the various averaging calculations performed to generate FIGS. 3A to 3C, as simulated in software, included rounding and accordingly are more accurate than the nonrounded averaging that is performed by the hardware.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, instead of using a right shift to divide by 2 or by $2^n$ without rounding when forming pivot values, a more complex circuit may be used that include a rounding feature; such a circuit would be more complex in terms of hardware but more accurate.

In another alternative embodiment, a window of $2^{n-1}$ pixels spaced on either side of the pixel being filtered can be used in generating minimum and maximum values and in generating an average original pixel value to become the pivot value. Doing so will ensure that the pixels used to form the pivot are evenly distributed on both sides of the original pixel location. This can be achieved by extending the shift register and sorter circuit 20 by one additional stage. In order to achieve the advantage of dividing by an integral power of two, the original pixel value at the original pixel location could be excluded from the original pixel values that are averaged to form a pivot value, so that this average can be formed by dividing by $2^n$. (An alternative accumulator structure would be needed to sum the appropriate pixel values to accomplish this approach.)

In another alternative embodiment, a weighted average of neighboring original pixel values could be used to compute a pivot value. So long as the sum of the weights is chosen to be a power of two, division by a power of two can be used to form the weighted average pivot value. Here again, an alternative accumulator structure would be needed to sum the weighted original pixel values.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of filtering a video signal to enhance sharpness of edges when said video signal is produced on a video display, said video signal comprising input pixel values to be displayed at each of a plurality of locations on said video display, the method comprising:
    identifying a pivot value at a first location that is different than the input pixel value to be displayed at said first location, based on the input pixel values of pixels to be displayed at and/or neighboring said first location,
    computing a filtered value for a pixel at said first location by adding to the pivot value, an amount based on the difference said pivot value and a value of a pixel at and/or neighboring said first location, and
    repeating at least said computing step to compute filtered values for pixels at second and additional locations.

2. The method of claim 1 further comprising repeating said identifying step at second and additional locations to identify pivot values to be used in computing filtered values for pixels at said second and additional locations.

3. The method of claim 1 wherein said pixel values represent luminance to be reproduced at locations on said video display.

4. The method of claim 1 wherein said pivot value is identified based on averaging input pixel values of an input set including a number of pixels at and/or neighboring said first location.

5. The method of claim 4 wherein said number of pixels in said input set is an integer power of two.

6. The method of claim 5 wherein said number of pixels in said input set is eight.

7. The method of claim 1 wherein said pivot value is identified based on identifying maximum and minimum input pixel values in an input set including a number of pixels at and/or neighboring said first location.

8. The method of claim 7 wherein said pivot value is identified by averaging said maximum and minimum input pixel values.

9. The method of claim 7 wherein said number of pixels in said input set is an integer power of two.

10. The method of claim 7 wherein said number of pixels in said input set is eight.

11. The method of claim 1 wherein computing a filtered value for a pixel at said first location further comprises identifying maximum and minimum input pixel values in an input set including a number of pixels at and/or neighboring said first location, and limiting said filtered value to not greater than said maximum input pixel value and not less than said minimum input pixel value.

12. The method of claim 1 wherein computing a filtered value for a pixel at said first location comprises adding to the pivot value, the difference said pivot value and a value of a pixel at and/or neighboring said first location multiplied by a factor.

13. The method of claim 12 wherein said factor is an integer power of two.

14. Apparatus for filtering a video signal to enhance sharpness of edges when said video signal is produced on a video display, said video signal comprising input pixel values to be displayed at each of a plurality of locations on said video display, the apparatus comprising:

first circuitry identifying a pivot value at a first location that is different than the input pixel value to be displayed at said first location, based on the input pixel values of pixels to be displayed at and/or neighboring said first location, and second circuitry computing a filtered value for a pixel at said first location by adding to the pivot value, an amount based on the difference said pivot value and a value of a pixel at and/or neighboring said first location, and computing filtered values for pixels at second and additional locations.

15. The apparatus of claim 14 wherein said first circuitry identifies additional pivot values to be used in computing filtered values for pixels at said second and additional locations.

16. The apparatus of claim 14 wherein said pixel values represent luminance to be reproduced at locations on said video display.

17. The apparatus of claim 14 wherein said first circuitry identifies a pivot value based on averaging input pixel values of an input set including a number of pixels at and/or neighboring said first location.

18. The apparatus of claim 17 wherein said number of pixels in said input set is an integer power of two.

19. The apparatus of claim 18 wherein said number of pixels in said input set is eight.

20. The apparatus of claim 14 wherein said first circuitry identifies a pivot value based on identifying maximum and minimum input pixel values in an input set including a number of pixels at and/or neighboring said first location.

21. The apparatus of claim 20 wherein said first circuitry identifies a pivot value by averaging said maximum and minimum input pixel values.

22. The apparatus of claim 20 wherein said number of pixels in said input set is an integer power of two.

23. The apparatus of claim 20 wherein said number of pixels in said input set is eight.

24. The apparatus of claim 14 wherein said second circuitry computes a filtered value for a pixel at said first location by identifying maximum and minimum input pixel values in an input set including a number of pixels at and/or neighboring said first location, and limiting said filtered value to not greater than said maximum input pixel value and not less than said minimum input pixel value.

25. The apparatus of claim 14 wherein said second circuitry computes a filtered value for a pixel at said first location by adding to the pivot value, the difference said pivot value and a value of a pixel at and/or neighboring said first location multiplied by a factor.

26. The apparatus of claim 25 wherein said factor is an integer power of two.

\* \* \* \* \*

UNITED STATES PATENT AND TRADEMARK OFFICE
CERTIFICATE OF CORRECTION

PATENT NO. : 6,175,656 B1  Page 1 of 1
DATED : January 16, 2001
INVENTOR(S) : Dzung Hoang It is certified that error appears in the above-identified patent and that said Letters Patent is hereby corrected as shown below:

<u>Column 1,</u>
Line 27, reads "properties Such as" and should read -- properties such as --.

<u>Column 2,</u>
Line 1, reads "DRAWING" and should read -- DRAWINGS --.
Line 19, reads "K=8" and should read -- K=16 --.
Line 50, reads "according to the formula" and should read -- according to the formula: --.

<u>Column 3,</u>
Lines 12, 15 and 39, read "according to the formula" and should read -- according to the formula: --.

<u>Column 7,</u>
Line 30, reads "in which ease all" and should read -- in which case all --.

<u>Column 8,</u>
Line 7, reads "applicants" and should read -- applicant --.
Line 12, reads "that include" and should read -- that includes --.
Line 25, reads "that arc" and should read -- that are --.
Line 53, reads "difference said pivot" and should say -- difference between said pivot --.

<u>Column 9,</u>
Lines 25 and 42, reads "difference said pivot" and should say -- difference between said pivot --.

<u>Column 10,</u>
Line 38, reads "difference said pivot" and should say -- difference between said pivot --.

Signed and Sealed this

Nineteenth Day of March, 2002

*Attest:*

*Attesting Officer*

JAMES E. ROGAN
*Director of the United States Patent and Trademark Office*